US 6,430,061 B1

(12) United States Patent
Grant et al.

(10) Patent No.: US 6,430,061 B1
(45) Date of Patent: Aug. 6, 2002

(54) SELF-TOLERANCING FIBER OPTIC TRANSCEIVER SHIELD

(75) Inventors: Mark S. Grant, White Lake; Larry J. Kim, Ann Arbor; Richard P. Wong, Troy, all of MI (US)

(73) Assignee: Yazaki North America

( * ) Notice: Subject to any disclaimer, the term of this patent is extended or adjusted under 35 U.S.C. 154(b) by 0 days.

(21) Appl. No.: 09/710,312

(22) Filed: Nov. 10, 2000

(51) Int. Cl.[7] ............................ H05K 9/00; G02B 6/00; H01R 4/48; H01R 13/24
(52) U.S. Cl. ................. 361/816; 361/818; 385/92; 385/94; 439/729; 439/761; 439/847
(58) Field of Search .................. 361/807, 816, 361/818; 385/92, 94, 70, 78, 81; 439/724, 729, 761, 728, 788, 802, 803, 816, 817, 819, 839, 840, 847, 607

(56) References Cited

U.S. PATENT DOCUMENTS

| | | | |
|---|---|---|---|
| 4,227,765 A | 10/1980 | Neumann et al. | |
| 4,733,932 A | * 3/1988 | Frenkel et al. | 385/92 |
| 4,758,719 A | 7/1988 | Sasaki et al. | |
| 5,011,246 A | 4/1991 | Corradetti et al. | |
| 5,067,914 A | * 11/1991 | Seidel et al. | 439/607 |
| 5,138,679 A | 8/1992 | Edwards et al. | |
| 5,337,396 A | * 8/1994 | Chen et al. | 385/92 |
| 5,381,496 A | 1/1995 | Morlion et al. | |
| 6,033,247 A | 3/2000 | Gregory, II | |

* cited by examiner

Primary Examiner—David Martin
Assistant Examiner—Dameon E. Levi
(74) Attorney, Agent, or Firm—Young & Basile

(57) ABSTRACT

In an FOT connector housing which couples and retains an FOT and an optical fiber with the object of maintaining a desired distance between an FOT interface and the optical fiber, an EMI shield for the FOT comprising an FOT metal casing which maintains the interface side of the FOT in contact with a wall of the casing, the wall of the casing having a thickness designed to achieve and maintain the desired distance between the FOT interface and the optical fiber, the metal casing further including a spring member acting against the FOT cavity to maintain the FOT interface at the desired distance from the optical fiber under spring tension.

9 Claims, 4 Drawing Sheets

SELF-TOLERANCING FIBER OPTIC TRANSCEIVER SHIELD

FIELD OF THE INVENTION

The present invention is in the field of housings for establishing and securing the connection between a light-transmitting optical fiber and a fiber optic transmission (FOT) device.

BACKGROUND OF THE INVENTION

Fiber optic transmission (FOT) devices, also called optical-electronic devices, optoelectronic devices, optical converters and other names known in the art, are coupled with optical fibers for data and signal transmission by converting optical signals into electrical signals, electrical signals into optical signals, or both. Various connector and housing arrangements are known, many with the object of improving the efficiency of the coupling or connection by providing a uniform gap between the optical fiber and a light-receiving or light-transmitting interface on the FOT. This gap is preferably kept as small as possible to maintain good signal quality. However, the typical plastic connector housing which surrounds, aligns and establishes the optical-electronic coupling between the optical fiber and the FOT tends to introduce inconsistency into the spacing of the FOT and optical fiber due to tolerance-induced "float" in the molded plastic FOT cavity.

An additional difficulty in establishing uniform spacing between the FOT and optical fiber is the need for electromagnetic interference (EMI) shielding for the FOT in the housing.

SUMMARY OF THE INVENTION

The present invention is a device for simultaneously shielding and properly tolerancing an FOT relative to an optical fiber coupled thereto by a connector housing. In its broadest form, the invention comprises a metal EMI casing surrounding the FOT body (with an opening for the optical fiber interface), the EMI casing having at least one spring member acting against the connector housing to bias the FOT interface toward the mating optical fiber. This establishes and maintains uniform spacing between them, thereby overcoming excessive "float" and spacing caused by variations in the coupling, connector or housing structure.

In one preferred form of the invention, the spring member is part of the EMI casing itself and comprises one or more raised, flexible bumps or strips of the metal casing material located on a side (the "upper" side) opposite the FOT interface to force the FOT interface toward the coupled optical fiber in the connector housing. Alternately, the EMI casing may contain such spring members at different locations to act against different portions of the connector housing and further align and tolerance the FOT interface relative to the optical fiber. The lower wall of the metal EMI casing around the interface opening can be closely toleranced to establish the preferred spacing of the FOT interface from the optical fiber.

In a further alternate embodiment, the spring member is a resilient, gasket-type member on the FOT or pre-installed in the FOT receptacle in the connector housing to receive the FOT under compression, again biasing the FOT interface against the optical fiber.

These and other features and advantages of the invention will become apparent upon a further reading of the specification, in light of the accompanying drawings.

DETAILED DESCRIPTION OF THE ILLUSTRATED EMBODIMENTS

Figure 1:
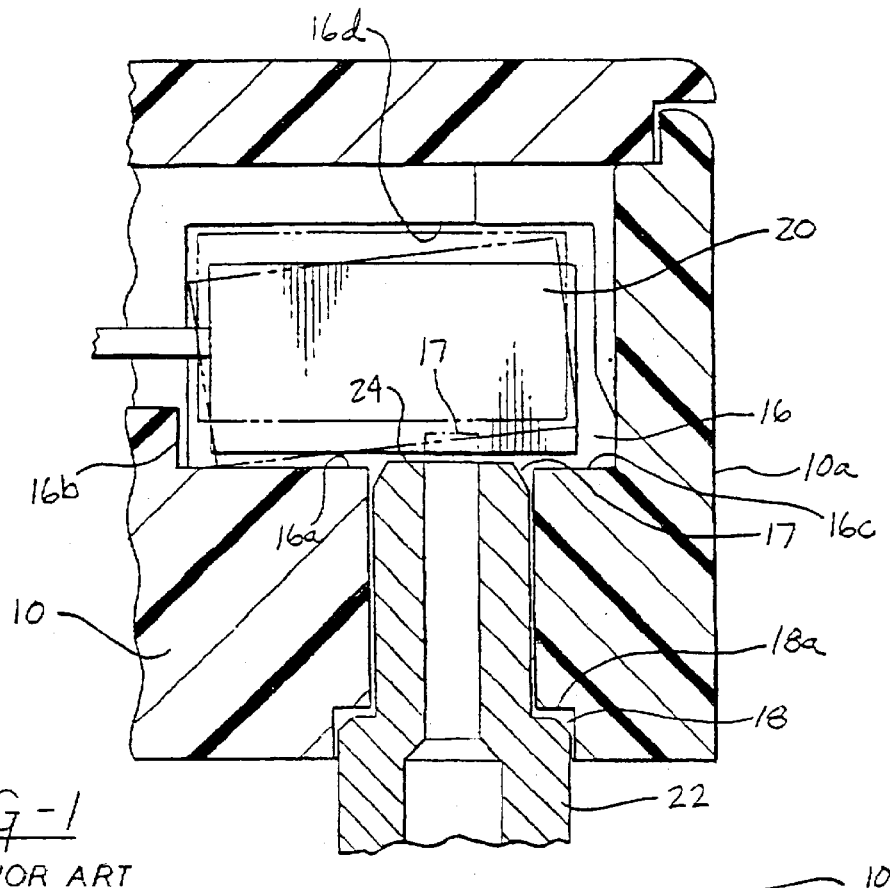
FIG. 1 is a cut-away view of a typical prior art connector housing for establishing a coupling between an optical fiber and an FOT.
Figure 2:
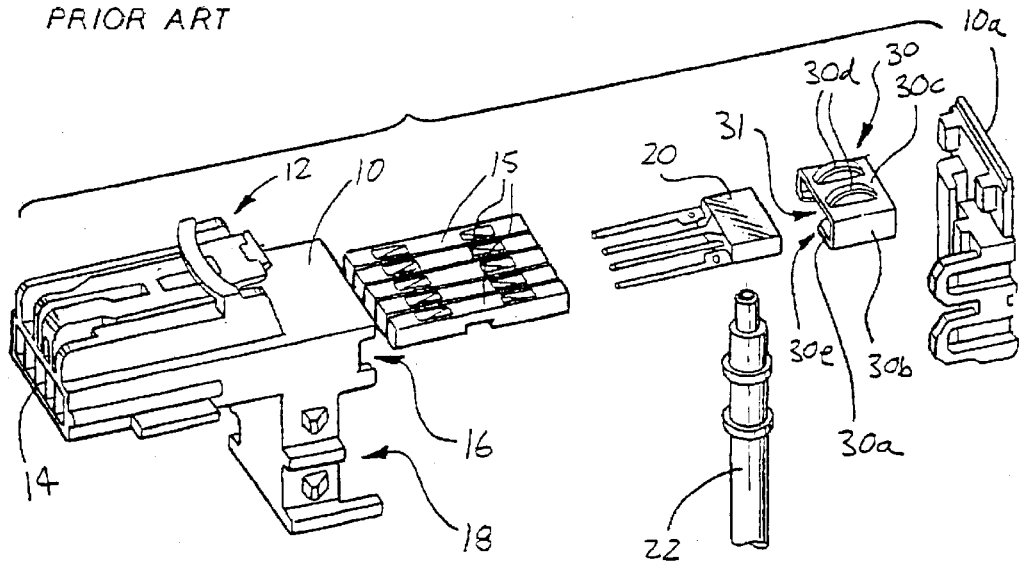
FIG. 2 is an exploded view of the connector housing, FOT and optical fiber of FIG. 1 prior to being assembled, and further illustrating a self-tolerancing casing for the FOT.

Referring first to FIGS. 1 and 2, a prior art coupling for an FOT 20 and optical fiber 22 is illustrated inside a conventional molded plastic connector housing 10 closed by a mating cover 10a. Connector housing 10 not only couples FOT 20 and optical fiber 22, but typically further includes locking structure such as that shown at 12 (FIG. 2) to positively secure it to a mating terminal housing. A terminal receptacle portion 14 located rearwardly of the FOT cavity 16 typically houses a plurality of electrical connection terminals 15 for connecting the FOT 20 to a plurality of wires which provide electrical signals to the FOT or receive electrical signals from the FOT. FOT 20 is located in FOT cavity 16 adjacent the terminal receptacle portion 14. Cavity 16 is molded to include locating shoulders, abutments, and other surfaces such as those at 16a and 16b to position an interface portion 17 of the FOT 20 immediately adjacent the tip of a coupled optical fiber 22 to establish a transmission path between FOT 20 and the optical fiber 22.

An optical fiber cavity 18 is formed in housing 10 below FOT cavity 16, usually with at least one stepped locating wall or shelf 18a and communicating with the FOT cavity 16 at FOT interface region 17. Shoulders or steps 18a are molded to receive and position the end of an optical fiber (or as shown in the illustrated embodiment, a typical fiber-terminating ferrule) as precisely and closely as possible to FOT interface region 17.

It will be understood by those skilled in the art that it is desirable to minimize the gap 24 between the end of the optical fiber 22 and the FOT interface 17, thereby optimizing signal transmission between them. It is also desirable to have gap 24 as uniform as possible from one device to the next, so that signal quality between multiple devices coupled by connector housings 10 will be uniform. It will be recognized by those skilled in the art, however, that unavoidable tolerances and manufacturing imperfections in the molding process for the plastic connector housing result in FOT "float" within cavity 16 from one device to another, such that the gap 24 varies from one device to another. FIG. 1 illustrates FOT float in exaggerated form with broken lines showing various FOT positions.

It is generally preferred to maintain a minimal gap between FOT interface 17 and optical fiber 22. In some applications, however, it may be desirable to place them in direct contact.

Referring next to FIG. 2, the connector housing 10 and other components of FIG. 1 are illustrated in an exploded, disassembled view, with the addition of an FOT casing 30 embodying a preferred form of the present invention. Casing 30 is made from metal, for example stamped using known techniques, and is designed to fit snugly over FOT 20 to form an outer, EMI-shielding skin or surface substantially surrounding the FOT. In the illustrated embodiment casing 30 includes a lower surface 30a, three side surfaces 30b, and an upper surface 30c including integral spring members 30d in the form of raised bumps or strips formed integrally from the metal of upper surface 30c. An open front side 30e is sized to accept the FOT 20 in a close comforming fit. Lower surface 30a includes an interface opening 31, in the illustrated embodiment a rounded slot, located in alignment with FOT interface 17 on the lower surface of the FOT.

FOT casing 30 can be made from any metal or metal alloy known for use in EMI shielding of small electrical components. FOT interface 17 can be any known type of light transmission or reception element, including but not limited to LED's, photodiodes, photo transistors and the like.

FOT casing 30 preferably fits over the FOT like a second skin, such that an FOT provided with casing 30 will fit into a standard FOT cavity 16 in the connector housing 10. Alternately, the FOT cavity 16 and the connector housing could be molded specifically for an FOT supplied with casing 30, for example with slightly larger dimensions to accommodate the thickness of the casing.

It will further be understood, however, that although a separate FOT casing 30 is illustrated and is presently preferred, it is possible to manufacture the FOT 20 itself with an integral EMI-shielded outer surface; i.e., with the "casing" built in during the manufacturing process. Henceforth, the term "casing" as used hereafter is intended to include both separately-formed casings, and casings or skins built into the FOT 20 during its manufacture.

Figure 3:
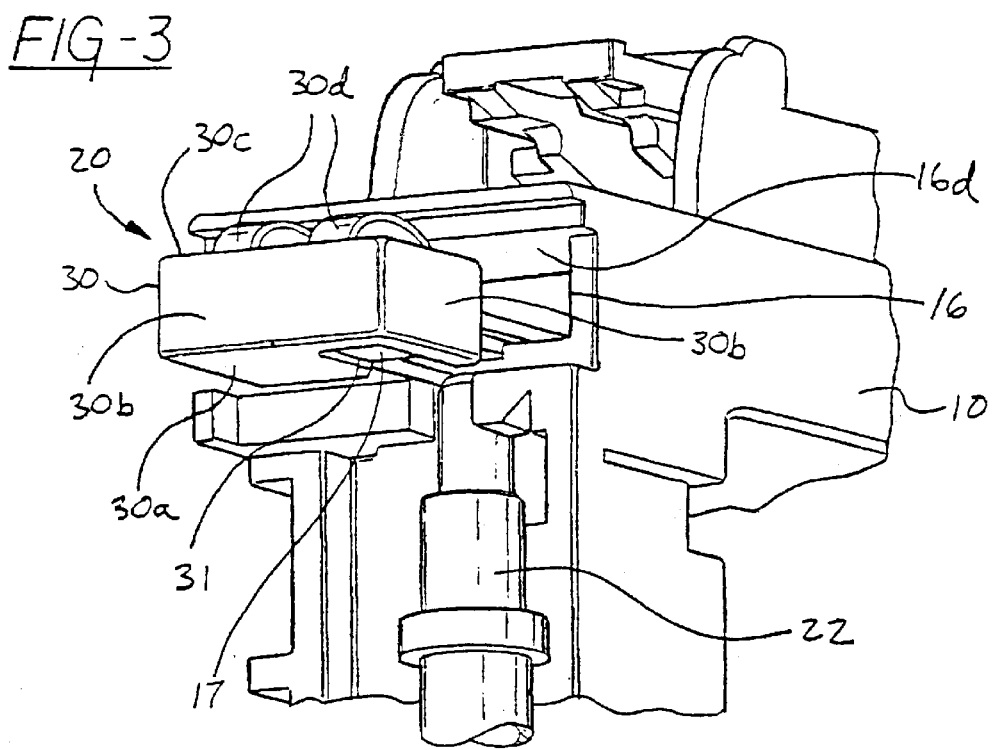
FIG. 3 is a perspective view of the connector housing and FOT interface region illustrating the insertion of an FOT with the self-tolerancing casing of FIG. 2.

Referring next to FIG. 3, FOT 20 equipped with the self-tolerancing casing 30 is shown being inserted into FOT cavity 16 in connector housing 10, above the already inserted optical fiber 22. The relationship of the transmission interface opening 31 in lower surface 30a of the casing can clearly be seen in its aligned relationship with the upper end of optical fiber 22 and the FOT interface region 17. Spring members 30 d are raised a sufficient distance from the upper surface 30c of casing 30 that they are compressed by an upper surface or ceiling 16d of the FOT cavity 16 upon insertion.

Figure 4:
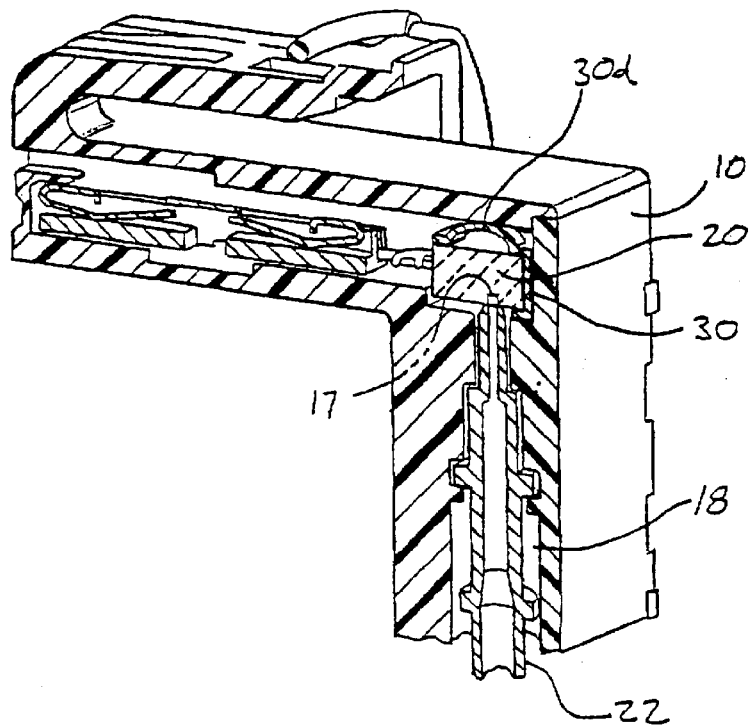
FIG. 4 is a cut-away perspective view illustrating the FOT and self-tolerancing casing fully inserted in the connector housing with the FOT interface aligned with the optical fiber.
Figure 6:
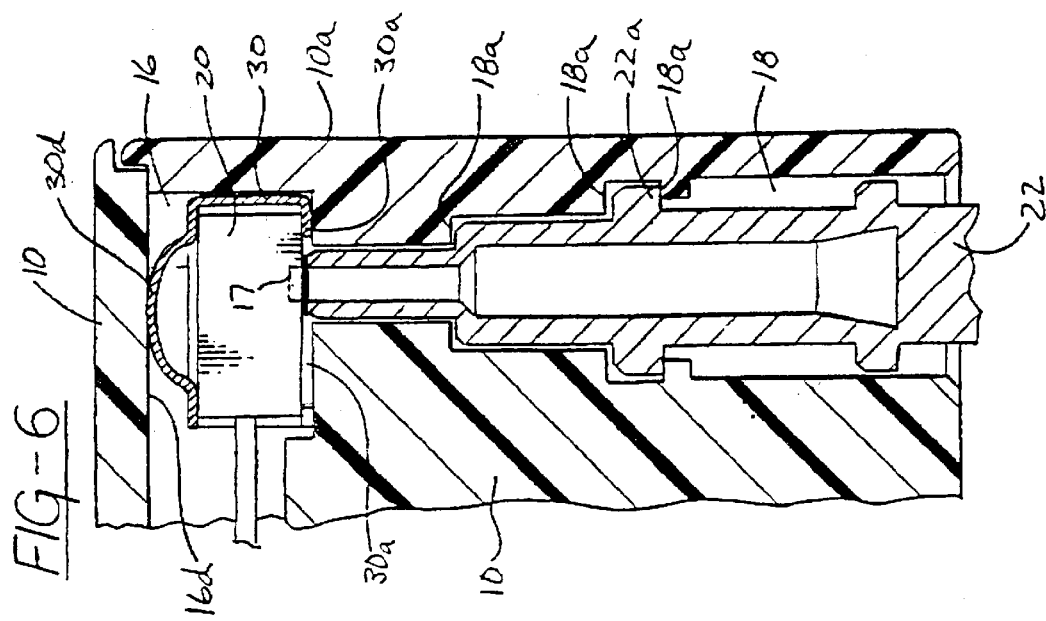
FIG. 6 is a side elevational view, partly in section, of the FOT/optical fiber interface with direct contact and a comprehensive view of the optical fiber positioning structure in the connector housing.
Figure 5:
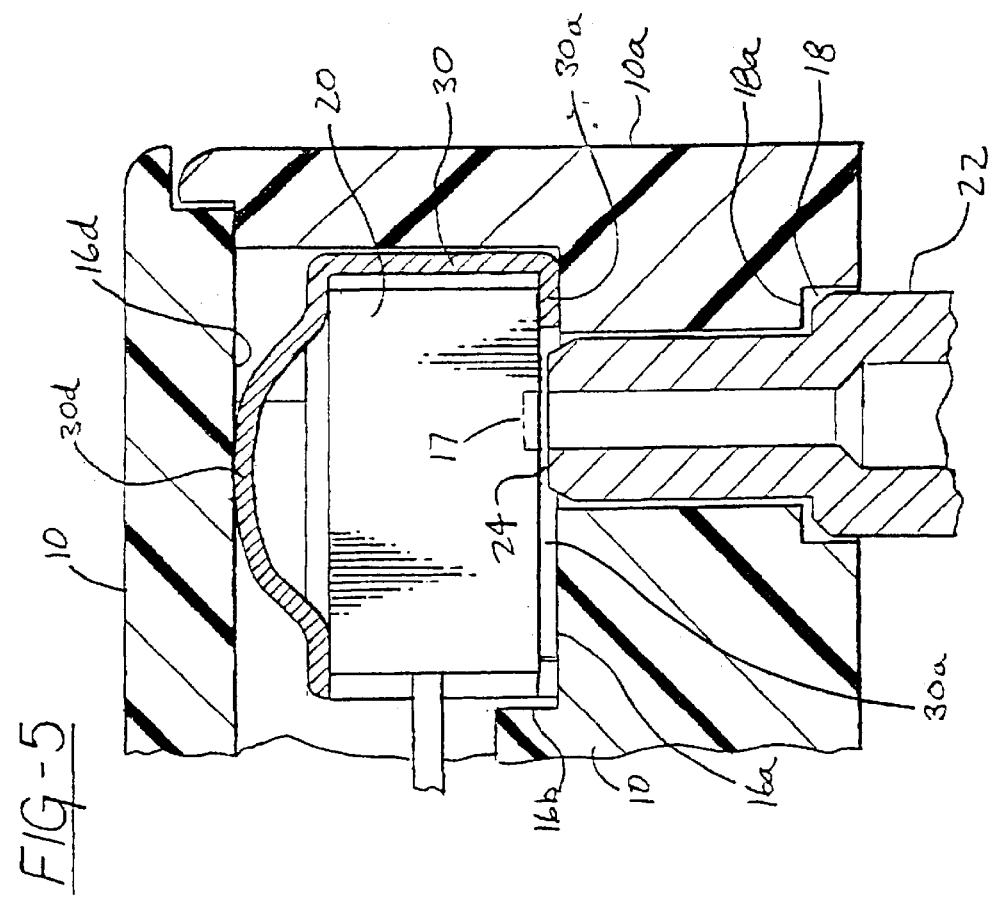
FIG. 5 is a side elevational view, in section, of the FOT installed in its cavity in the connector housing and acted upon by the self-tolerancing casing.

Referring to FIGS. 4 through 6, the compression of spring members 30d by the ceiling of cavity 16 can be seen to bias bottom wall 30a downwardly against the lower surface of cavity 16 around the FOT interface region 17, thereby putting the FOT interface as close as desired to the end of optical fiber 22. FOT 20, and in particular its lower surface around interface region 17, is held securely against bottom wall 30a of FOT casing 30. Since the metal FOT casing 30 and in particular the thickness of bottom wall 30a can be toleranced more closely and uniformly than plastic materials, the gap 24 between the end of optical fiber 22 and the FOT interface can be precisely established by the thickness of bottom wall 30a around opening 31, taking into account whether interface 17 is recessed, protruding, or flush with the bottom of FOT 20. Spring members 30d will always place and retain bottom wall 30a directly against the bottom of cavity 16, such that the uniformity of gap 24 is much improved and maintained.

It will be understood that although a small gap 24 is illustrated, FOT casing 30 can be toleranced to place the appropriate portion of the FOT or its interface in direct contact with optical fiber 22. Whether to leave a slight gap 24 or to bring FOT 20 and optical fiber 22 into direct contact will be a matter of choice for those skilled in the art. FOT casing 30 can be adapted to either arrangement.

Referring next to FIG. 6, the function of an FOT casing 30 and its spring members in minimizing gap 24 is further illustrated by reference to the various dimensional tolerances in the FOT cavity 16 and fiber locating channel 18 which normally allow certain amounts of movement in the vertical direction of the optical fiber 22 and FOT 20. Such movement is undesirable, as it would cause variations in the quality of data transfer between the FOT and optical fiber. Although such movement can be minimized by establishing extremely tight tolerances during the manufacturing process, such minimization is difficult and expensive and in many cases not practical. With FOT casing 30 according to the present invention, however, vertical movement of the FOT 20 relative to optical fiber 22 can be eliminated. Additionally, by shaping spring members 30d with an appropriate height above FOT 20, and by giving them an appropriate spring force, vertical movement of the optical fiber can be eliminated in cases where it is desirable to have a direct abutment of the FOT 20 or its interface region 17 with the upper end of optical fiber 22. In the illustrated embodiment of FIG. 6, the spring members 30d on FOT casing 30 have forced FOT 20 downwardly into abutting contact with the tip of optical fiber 22. Spring members 30d have sufficient force to thereby force shoulder portion 22a of the optical fiber downwardly against corresponding locating shoulders 18a in the fiber channel 18. Relative vertical movement between the optical fiber 22 and FOT 20 is thereby eliminated.

It will be understood from the foregoing that spring members 30d are not limited to the surface of the FOT opposite the interface region 17. Spring members may be placed on any or all surfaces of the FOT casing 30 to assist in aligning and/or locating the FOT in a desired relationship with an optical fiber, and further to eliminate relative movement between them.

It will also be apparent to those skilled in the art that while raised, curved strips exhibiting a spring bias are preferred, the spring members may take other forms and shapes. They need not be connected at two ends as illustrated, but in some circumstances might be cantilevered. Although preferably formed integrally from the metal material of the casing 30, spring members 30d may be added separately to the casing and may comprise materials other than the metal of the casing. The illustrated embodiment is merely preferred for its simplicity of structure and ease of manufacturing; virtually any spring member built into or secured to the casing to provide automatic tolerancing of the FOT assembly upon insertion into cavity 16 is considered within the scope of the invention.

Figure 7:
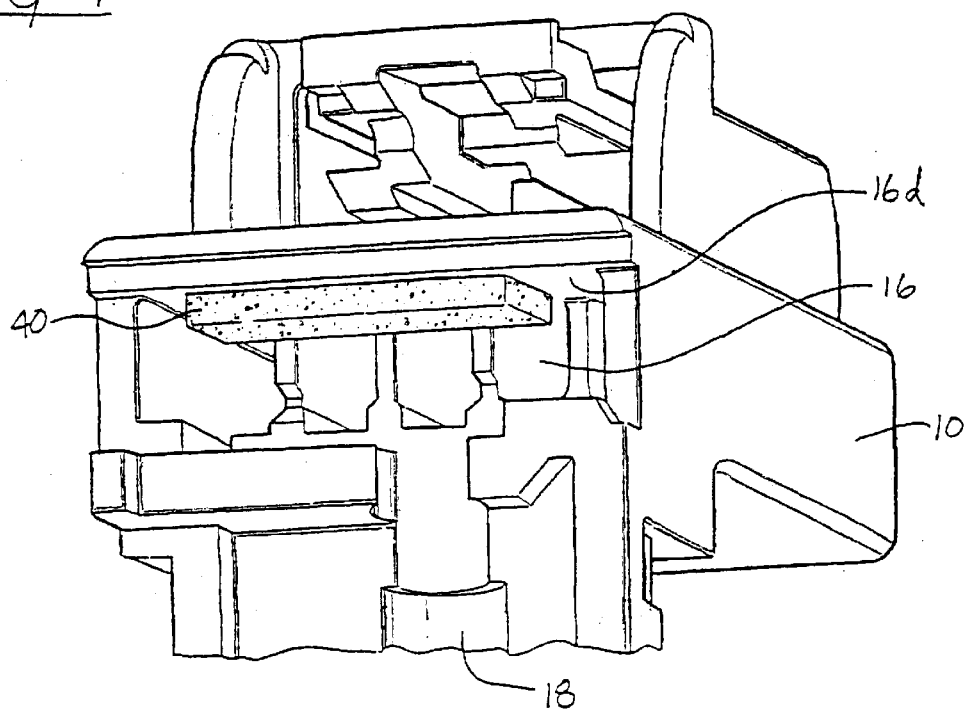
FIG. 7 is a perspective view of the FOT receptacle in the connector housing, with the FOT removed and with an alternate tolerancing device pre-installed in the FOT receptacle.
Figure 8:
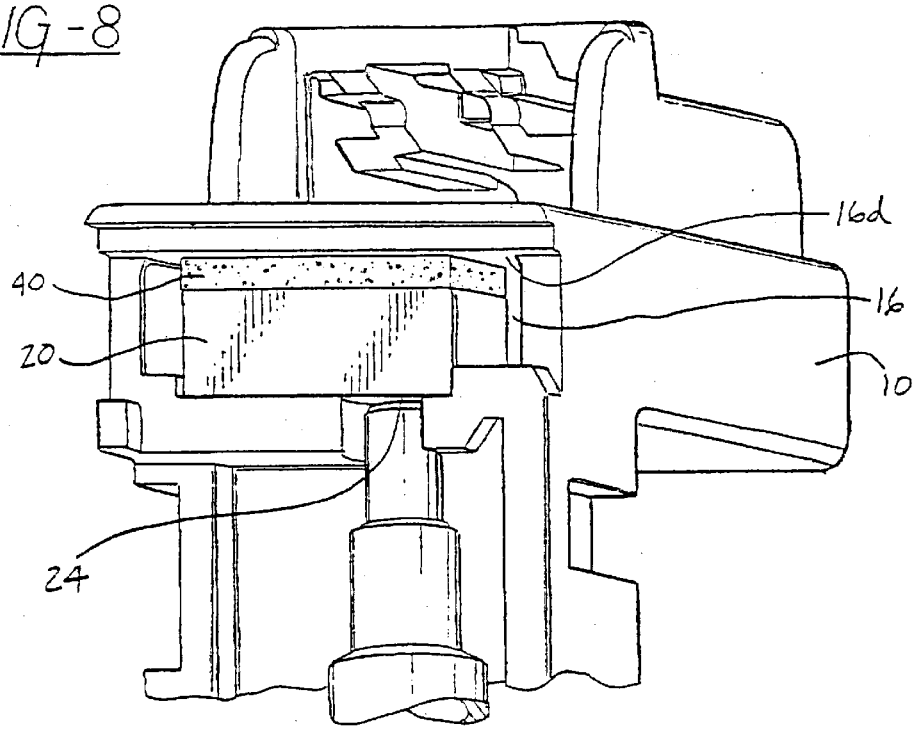
FIG. 8 illustrates the tolerancing device of FIG. 7 secured to an FOT.

Referring next to FIG. 7, an alternate tolerancing device for use with FOT 20 is illustrated as a resilient gasket member 40 pre-installed, for example with adhesive, in the FOT cavity 16 to exert a downward, gap-reducing force against the FOT. Alternately, as shown in FIG. 8, the gasket can be secured to the surface of the FOT 20 prior to inserting the FOT in cavity 16.

It will be understood by those skilled in the art that the foregoing embodiments are not intended to limit the invention, but rather are preferred examples of carrying out the invention.

Accordingly, we claim:

1. An apparatus for establishing uniform spacing between a fiber optic transmission device (FOT) and an optical fiber and for shielding the FOT from electromagnetic interference, the apparatus comprising:

an FOT having a light receiving-or-transmitting interface;

a housing having a first cavity for receiving the FOT and a second cavity adapted to receive the optical fiber; and a metal casing shaped to surround and conform to the exterior of the FOT such that a surface of the FOT associated with the FOT interface is in contact with a wall portion of the casing, the casing further having a spring member on an outer surface thereof, the spring member designed to engage portions of the first cavity to force the wall portion of the casing against a surface of the first cavity such that the FOT interface is the desired distance from the optical fiber and to maintain the FOT interface at the desired distance under spring tension.

2. The apparatus of claim 1, wherein the spring member comprises a raised, flexible portion of the metal casing.

3. The apparatus of claim 1, wherein the spring member comprises a member added to the metal casing.

4. The apparatus of claim 3, wherein the spring member comprises a resilient gasket.

5. An electromagnetic shield for use in a fiber optic transmission device (FOT) housing including an FOT cavity, an FOT retained in the cavity, an optical fiber cavity communicating with the FOT cavity in a region corresponding to an FOT interface, and an optical fiber retained in the optical fiber cavity a desired distance from the FOT interface, the shield comprising:

a metal casing conforming to the exterior of the FOT such that a surface of the FOT associated with the FOT interface is in contact with a wall portion of the casing, the casing further having a spring member on an outer surface thereof, the spring member adapted to engage portions of the FOT cavity and to force the wall portion of the casing against a surface of the FOT cavity such that the FOT interface is the desired distance from the optical fiber and to maintain the FOT interface at the desired distance under spring tension.

6. The shield of claim 5, wherein the spring member comprises a raised, flexible portion of the metal casing.

7. The shield of claim 5, wherein the spring member comprises a member added to the metal casing.

8. The shield of claim 7, wherein the spring member comprises a resilient gasket.

9. A metal electromagnetic-interference-shielding casing for a fiber optic transmission device (FOT), the casing being shaped to fit around the FOT and including a spring member adapted to engage an FOT cavity in a plastic connector housing to place the FOT in a desired relationship under spring tension to an optical fiber positioned in the housing.

* * * * *